United States Patent
Abe et al.

(10) Patent No.: US 10,337,872 B2
(45) Date of Patent: Jul. 2, 2019

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Masaaki Abe, Wako (JP); Kunimichi Hatano, Wako (JP); Masahiko Asakura, Wako (JP); Naoto Sen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 114 days.

(21) Appl. No.: 15/497,848

(22) Filed: Apr. 26, 2017

(65) Prior Publication Data

US 2017/0308094 A1 Oct. 26, 2017

(30) Foreign Application Priority Data

Apr. 26, 2016 (JP) .................................. 2016-088261

(51) Int. Cl.
| | |
|---|---|
| G01C 21/00 | (2006.01) |
| B60W 30/00 | (2006.01) |
| G08G 1/16 | (2006.01) |
| G05D 1/00 | (2006.01) |
| G01C 21/34 | (2006.01) |
| B60W 30/18 | (2012.01) |
| B60W 30/09 | (2012.01) |
| G05D 1/02 | (2006.01) |
| G08G 1/0968 | (2006.01) |

(52) U.S. Cl.
CPC ......... *G01C 21/3415* (2013.01); *B60W 30/09* (2013.01); *B60W 30/18* (2013.01); *G05D 1/0212* (2013.01); *G08G 1/0968* (2013.01); *G08G 1/161* (2013.01); *G08G 1/167* (2013.01); *B60W 2710/20* (2013.01); *B60W 2720/10* (2013.01); *G05D 2201/0213* (2013.01)

(58) Field of Classification Search
CPC . G01C 21/3415; B60W 30/09; G05D 1/0212; G08G 1/0968
See application file for complete search history.

(56) References Cited

FOREIGN PATENT DOCUMENTS

| | | |
|---|---|---|
| JP | 2004-17867 A | 1/2004 |
| JP | 2008-160447 A | 7/2008 |
| JP | 2015-162005 A | 9/2015 |
| WO | 2011/158347 A1 | 12/2011 |

OTHER PUBLICATIONS

Office Action dated Oct. 17, 2017, issued in counterpart Japanese Application No. 2016-088261, with English machine translation. (7 pages).

*Primary Examiner* — Yonel Beaulieu
(74) *Attorney, Agent, or Firm* — Westerman, Hattori, Daniels & Adrian, LLP

(57) ABSTRACT

A vehicle control system includes: an automated driving controller configured to execute automated driving which autonomously controls at least one of speed control and steering control to allow a vehicle to travel along a route to a destination; and a factor acquisition section configured to acquire a factor which is independent of travel requirements for the vehicle to travel by autonomously driving along the route to the destination. The automated driving controller changes the plan of the automated driving based on the factor acquired by the factor acquisition section.

10 Claims, 14 Drawing Sheets

FIG. 3
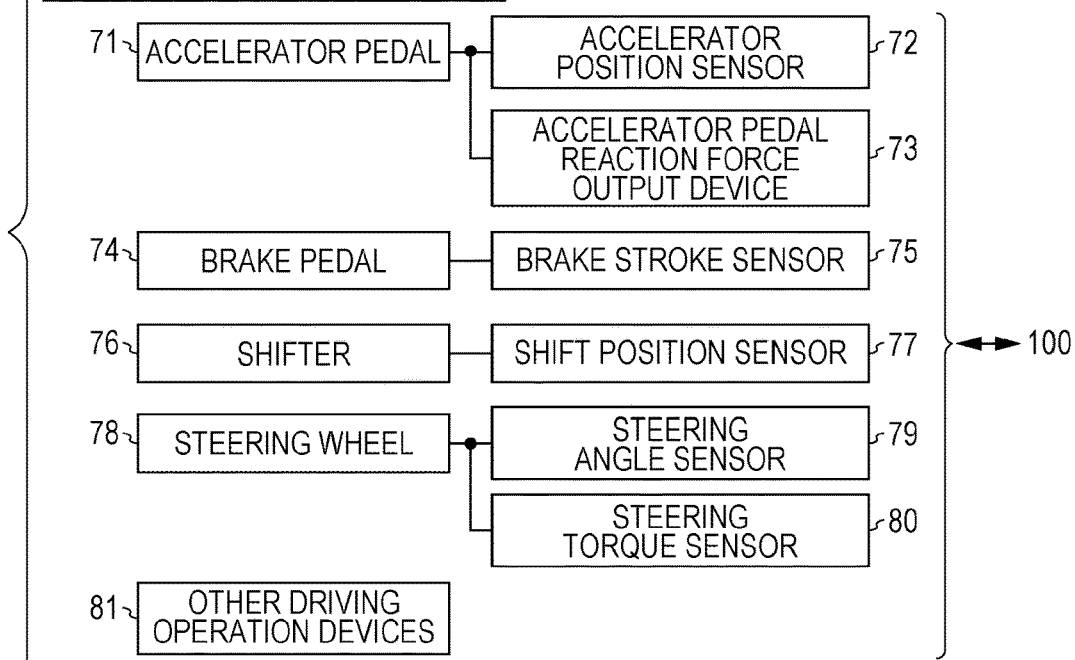
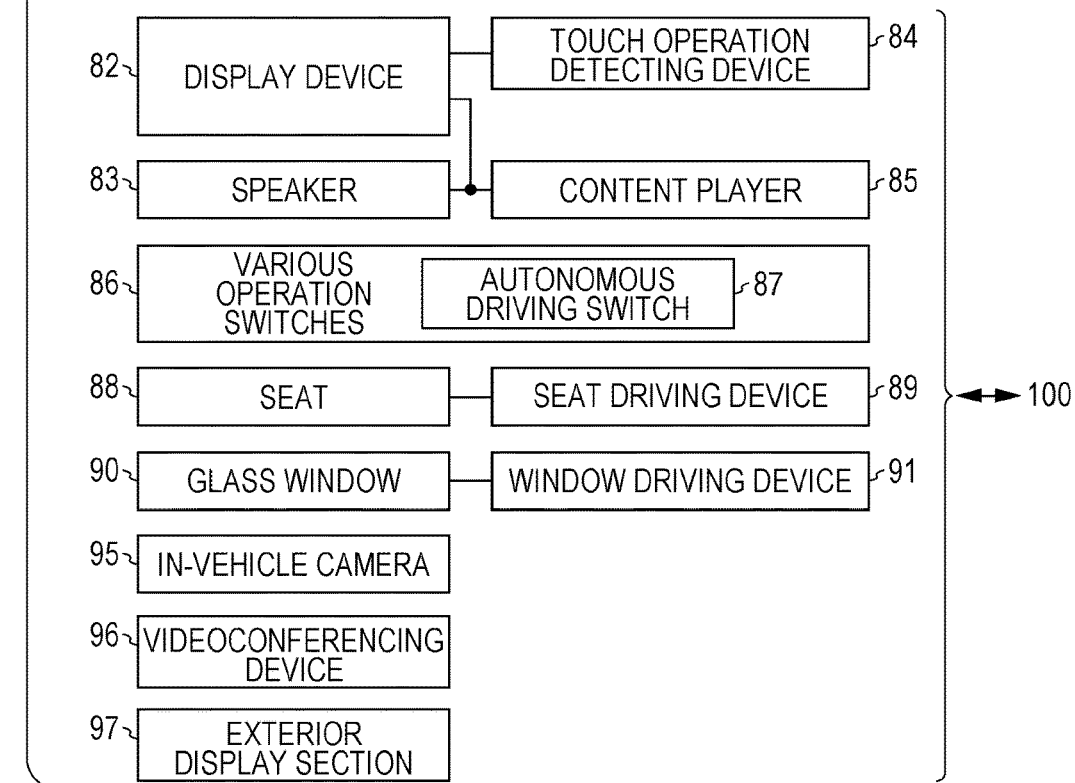

188

| DRIVING MODE<br>NON-DRIVING OPERATION | MANUAL DRIVING MODE | AUTONOMOUS DRIVING MODE | | | ... |
|---|---|---|---|---|---|
| | | MODE A | MODE B | MODE C | |
| NAVIGATION OPERATION | DISABLED | ENABLED | ENABLED | DISABLED | ... |
| CONTENT PLAY OPERATION | DISABLED | ENABLED | DISABLED | DISABLED | ... |
| INSTRUMENT PANEL OPERATION | DISABLED | ENABLED | ENABLED | ENABLED | ... |
| ... | ... | ... | ... | ... | ... |

| TIME | CH-A | CH-B | CH-C | CH-D | CH-E |
|---|---|---|---|---|---|
| 10:00 TO 11:00 | ** | ** | ** | ** | ** |
| 11:00 TO 12:00 | ** | ** | ** | ** | ** |
| 13:00 TO 14:00 | ** | ** | ** | ** | ** |
| 15:00 TO 16:00 | ** | ** | ** | ** | ** |

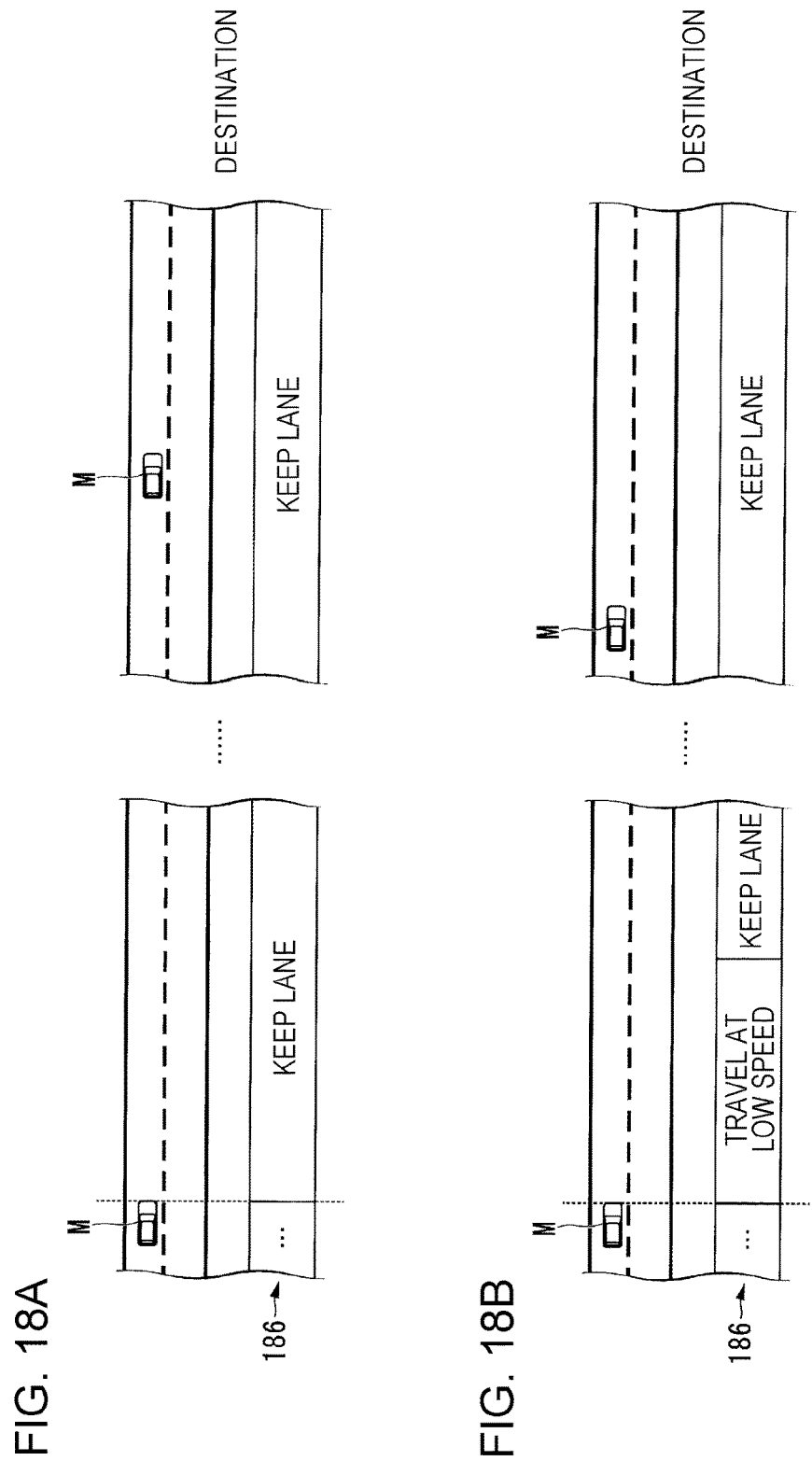

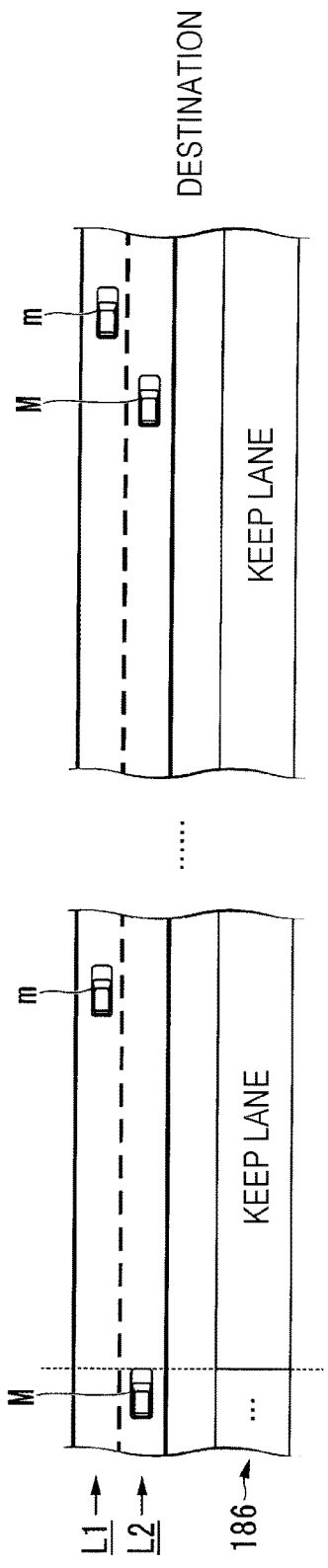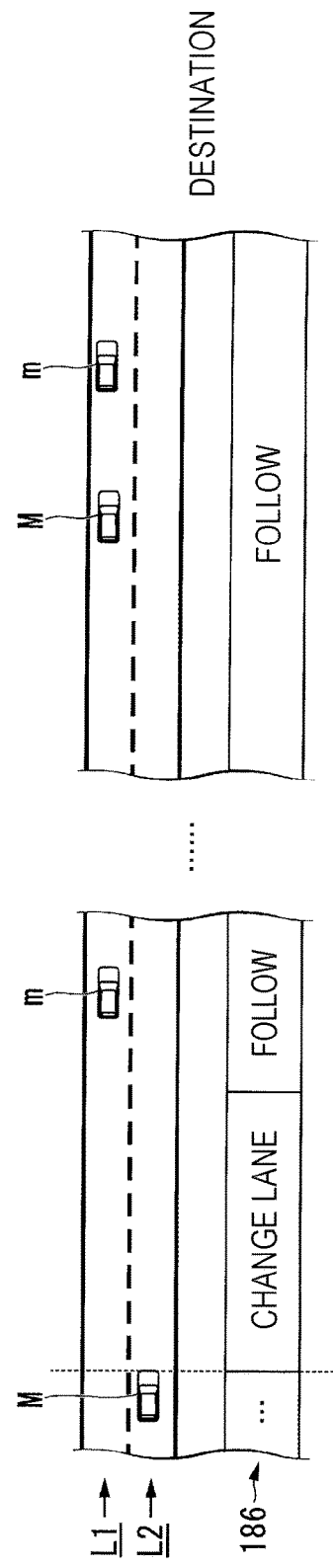

VEHICLE CONTROL SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-088261, filed Apr. 26, 2016, entitled "Vehicle Control System, Vehicle Control Method, and Vehicle Control Program." The contents of this application are incorporated herein by reference in their entirety.

BACKGROUND

1. Field

The disclosure relates to a vehicle control system, a vehicle control method, and a vehicle control program.

2. Description of the Related Art

In recent years, studies have been made on a technique of controlling a vehicle so that the vehicle autonomously travels along a route to the destination. In relation to the aforementioned technique, there has been known a driving assist system which determines, in response to an instruction to start the automated driving of a vehicle by a driver's operation, a mode of automated driving based on whether a destination of the automated driving is set; and if the destination is not set, determines, as the mode of automated driving, automated driving in which the vehicle will travel along the current travel route or automatically stopping (see International Publication No. WO2011/158347, for example).

According to the conventional technique, the vehicle is controlled only based on factors attributable to such travel requirements that the vehicle can travel to the destination quickly at low fuel consumption or can avoid a traffic jam. The conventional technique does not consider the other factors.

SUMMARY

In the light of such circumstances, the present application describes a vehicle control system, a vehicle control method, and a vehicle control program which are capable of supporting a wider range of usages of vehicles based on occupant's intentions.

A first aspect of the disclosure is a vehicle control system including: an automated driving controller configured to execute automated driving which autonomously controls at least one of speed control and steering control to allow a vehicle to travel along a route to a destination; and a factor acquisition section configured to acquire a factor which is independent of a travel requirement for the vehicle to travel by autonomously driving along the route to the destination. The automated driving controller changes a plan of the automated driving based on the factor acquired by the factor acquisition section. The word "section" used in this application may mean a physical part or component of computer hardware or any device including a controller, a processor, a memory, etc., which is particularly configured to perform functions and steps disclosed in the application.

A second aspect of the disclosure is the vehicle control system according to the first aspect, in which the factor is a schedule of particular action that an occupant of the vehicle may perform within the vehicle if the vehicle is autonomously driven.

A third aspect of the disclosure is the vehicle control system according to the second aspect, in which the particular action is viewing of a content, and the automated driving controller adjusts a duration of the automated driving to an estimated end time of the content.

A fourth aspect of the disclosure is the vehicle control system according to the second aspect, in which the particular action is participation in a videoconference, and the automated driving controller adjusts a duration of the automated driving to an estimated end time of the videoconference.

A fifth aspect of the disclosure is the vehicle control system according to the second aspect, in which the automated driving controller does not change the plan of the automated driving based on the factor acquired by the factor acquisition section when the vehicle is estimated to arrive at the destination before the estimated end time of the schedule of the particular action and it is determined that the destination has an area where the vehicle can be parked at the destination.

A sixth aspect of the disclosure is the vehicle control system according to the first aspect, in which the factor is a target time of arrival at the destination which is set by the occupant, and the automated driving controller performs speed adjustment or detour control of the vehicle to delay arrival at the destination when the vehicle is estimated to arrive at the destination before the target time of arrival.

A seventh aspect of the disclosure is the vehicle control system according to the sixth aspect, in which the automated driving controller does not perform the speed adjustment or detour control of the vehicle to delay arrival at the destination when it is determined that there is an area where the vehicle can be parked at the destination.

An eighth aspect of the disclosure is the vehicle control system according to the first aspect, further including: an output section configured to output information to a surrounding vehicle traveling around the vehicle. The automated driving controller causes the output section to output information prompting the surrounding vehicles to overtake the vehicle when changing the plan of the automated driving based on the factor acquired by the factor acquisition section.

A ninth aspect of the disclosure is a vehicle control method to execute automated driving which autonomously controls at least one of speed control and steering control to allow a vehicle to travel along a route to a destination. The method includes the steps of: acquiring a factor which is independent of a travel requirement for the vehicle to travel by autonomously driving along the route to the destination; and changing a plan of the automated driving based on the factor acquired by the factor acquisition section.

A tenth aspect of the disclosure is a vehicle control program causing an in-vehicle computer to execute automated driving which autonomously controls at least one of speed control and steering control to allow a vehicle to travel along a route to a destination. The program includes the processes to: acquire a factor which is independent of a travel requirement for the vehicle to travel by autonomously driving along the route to the destination; and change the plan of the automated driving based on the factor acquired by the factor acquisition section. It is understood and well known in the art that such program may be provided in a form of a computer program product having instructions stored in a computer readable media and readable and executable by a computer such as a vehicle control device to execute the instructions.

According to the first to seventh, ninth, and tenth aspects, the automated driving controller changes the plan of automated driving based on the factors independent of the travel requirements for the vehicle M to travel by autonomously driving along the route to the destination. It is therefore possible to widen the range of usages of vehicles based on the occupant's intentions.

According to the eighth aspect, the automated driving controller causes the output section to output the information prompting overtaking of the vehicle. It is therefore possible to let the surrounding vehicles know that the vehicle M is controlled in accordance with the changed plan of automated driving based on the factors independent of the travel requirements for the vehicle to travel.

BRIEF DESCRIPTION OF THE DRAWINGS

FIG. 3 is a block diagram of an HMI.

FIGS. 18A and 18B are diagrams illustrating an example of the way the action plan is changed.

FIGS. 19A and 19B are diagrams illustrating another example of the way the action plan is changed.

DESCRIPTION OF THE PREFERRED EMBODIMENTS

Hereinafter, a description is given of embodiments of a vehicle control system, a vehicle control method, and a vehicle control program of the disclosure with reference to the drawings.

Figure 1:
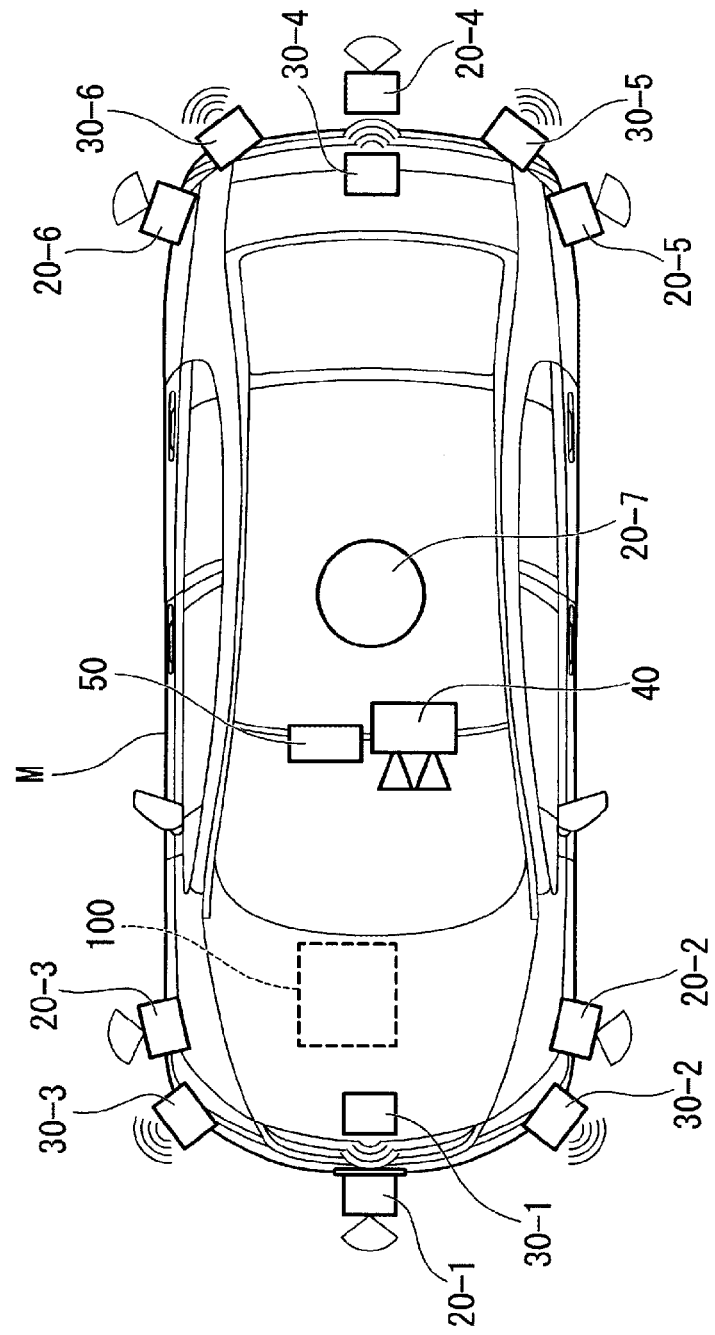
FIG. 1 is a view illustrating constituent components of a control system-mounted vehicle.

FIG. 1 is a view illustrating constituent components of a vehicle on which a vehicle control system 100 of each embodiment is mounted (hereinafter, referred to as a vehicle M). Examples of the vehicle on which the vehicle control system 100 is mounted are two-wheel, three-wheel, and four wheel automobiles, including automobiles powered by an internal combustion engine, such as a diesel or gasoline engine, electric vehicles powered by an electric motor, and hybrid vehicles including both an internal combustion engine and an electric motor. Electric vehicles are driven using electric power discharged from batteries such as secondary batteries, hydrogen fuel cells, metal fuel cells, and alcohol fuel cells, for example.

As illustrated in FIG. 1, the vehicle M is provided with sensors, including finders 20-1 to 20-7, radars 30-1 to 30-6, and a camera 40, a navigation device 50, and the vehicle control system 100.

The finders 20-1 to 20-7 are LIDARs (light detection and ranging or laser imaging detection and ranging) which measure the distance to an object by measuring scattering light for projected light, for example. For example, the finder 20-1 is attached to the front grill or the like, and the finders 20-2 and 20-3 are attached to side surfaces of the vehicle body, to door mirrors, within headlights, near side marker lamps, or the like. The finder 20-4 is attached to a trunk lid or the like, and the finders 20-5 and 20-6 are attached to lateral sides of the vehicle body, inside the tail lamp, or the like. Each of the aforementioned finders 20-1 to 20-6 has a detection range of about 150 degrees in the horizontal direction, for example. The finder 20-7 is attached to a roof or the like. The detection range of the finder 20-7 is 360 degrees in the horizontal direction, for example.

The radars 30-1 and 30-4 are long-distance millimeter-wave radars having a wider detection range in depth than the other radars, for example. The radars 30-2, 30-3, 30-5, and 30-6 are middle distance millimeter-wave radars having a narrower detection range in depth than the radars 30-1 and 30-4.

The finders 20-1 to 20-7 are referred to just as finders 20 below if not distinguished in particular, and the radars 30-1 to 30-6 are referred to just as radars 30 if not distinguished in particular. The radars 30 detect an object using a frequency modulated continuous wave (FM-CW) method, for example.

The camera 40 is a digital camera including a solid state image sensor such as a charge coupled device (CCD) or a complementary metal oxide semiconductor (CMOS), for example. The camera 40 is attached to upper part of the front windshield, the back of the rear-view mirror, or the like. The camera 40 is configured to repeatedly capture an image of the front view from the vehicle M periodically. The camera 40 may be a stereo camera including plural cameras.

The configuration illustrated in FIG. 1 is just an example and may be partially omitted. The configuration of the vehicle M may additionally include another configuration.

Figure 2:
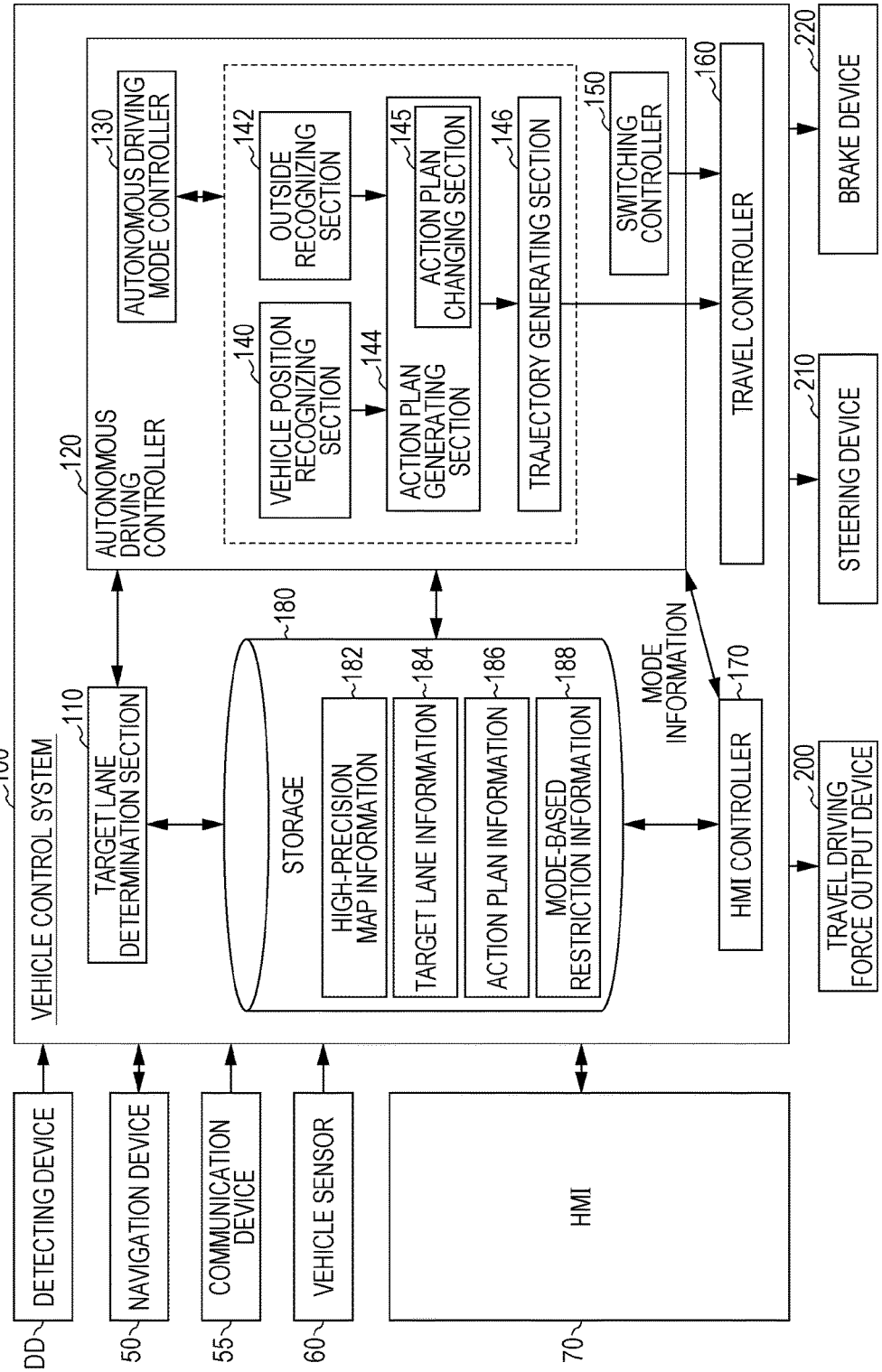
FIG. 2 is a functional block diagram of the vehicle control system and devices therearound.

FIG. 2 is a functional block diagram of a vehicle control system 100 according to the embodiment and other configurations therearound. The vehicle M is equipped with a detection device DD including the finders 20, radars 30, and camera 40, a navigation device 50, a communication device 55, a vehicle sensor 60, a human machine interface (HMI) 70, the vehicle control system 100, a travel driving force output device 200, a steering device 210, and a brake device 220. These devices and equipment are connected to each other via a multiple communication line such as a controller area network (CAN), a serial communication line, a wireless communication network, or the like. The vehicle control system of the disclosure does not indicate only the vehicle control system 100 and may include the configurations (the detection device DD, HMI 70, or the like) other than the vehicle control system 100.

The navigation device 50 includes a global navigation satellite system (GNSS) receiver, map information (a navigation map), a touch panel display device serving as a user interface, a speaker, a microphone, and the like. The navigation device 50 specifies the position of the vehicle M through the GNSS receiver and calculates the route from the specified position to the destination specified by the user. The route calculated by the navigation device 50 is provided to a target lane determination section 110 of the vehicle control system 100. The position of the vehicle M may be specified or complemented by an inertial navigation system (INS) using the output from the vehicle sensor 60. The navigation device 50 provides voice guidance or navigating display of the route while the vehicle control system 100 is executing a manual driving mode. The configuration to specify the position of the vehicle M may be provided independently of the navigation device 50. The navigation device 50 may be implemented by the function of a user's terminal device such as a smartphone or a tablet terminal, for example. In this case, the terminal device and vehicle control system 100 exchange information through wireless or wired communication.

The communication device 55 performs wireless communication using a cellular network, a Wi-Fi network, Bluetooth (registered trademark), dedicated short range communication (DSRC), or the like, for example.

The vehicle sensor 60 includes a vehicle speed sensor detecting vehicle speed, an acceleration sensor detecting acceleration, a yaw-rate sensor detecting angular speed around the vertical direction, a direction sensor detecting the orientation of the vehicle M, and the like.

FIG. 3 is a block diagram of the HMI 70. The HMI 70 includes driving operation components and non-driving operation components. These are not clearly separated. The driving operation components may include a non-driving operation function (and vice versa).

The driving operation components of the HMI 70 include an accelerator pedal 71, an accelerator position sensor 72, an accelerator pedal reaction force output device 73, a brake pedal 74, a brake pedal stroke sensor (or a master pressure sensor) 75, a shifter 76, a shifter position sensor 77, a steering wheel 78, a steering angle sensor 79, a steering torque sensor 80, and another driving operation device 81.

The accelerator pedal 71 is an operator configured to accept an instruction from a vehicle occupant to accelerate the vehicle (or an instruction to decelerate the vehicle by a return operation). The accelerator position sensor 72 detects the amount of stroke of the accelerator pedal 71 and outputs an accelerator position signal representing the amount of stroke to the vehicle control system 100. The accelerator position sensor 72 may be configured to directly output the accelerator position signal to the travel driving force output device 200, steering device 210, or brake device 220 instead of the vehicle control system 100. The same goes for the other driving operation components described below. The accelerator pedal reaction force output device 73 outputs force to the accelerator pedal 71 in the opposite direction to the direction of operation in response to an instruction from the vehicle control system 100, for example.

The brake pedal 74 is an operator configured to accept an instruction from the vehicle occupant to decelerate the vehicle. The brake stroke sensor 75 detects the amount of stroke (or depression force) of the brake pedal 74 and outputs a brake signal representing the result of detection to the vehicle control system 100.

The shifter 76 is an operator configured to accept an instruction to change the shift position by the vehicle occupant. The shift position sensor 77 detects the shift position specified by the vehicle occupant and outputs a shift position signal representing the result of detection to the vehicle control system 100.

The steering wheel 78 is an operator configured to accept an instruction from the vehicle occupant to turn the vehicle M. The steering angle sensor 79 detects the operation angle of the steering wheel 78 and outputs a steering angle signal representing the result of detection to the vehicle control system 100. The steering torque sensor 80 detects torque applied to the steering wheel 78 and outputs a steering torque signal representing the result of detection to the vehicle control system 100.

The other driving operation devices 81 include a joy stick, a button, a dial switch, and a graphical user interface (GUI) switch, for example. The other driving operation devices 81 accept instructions to accelerate, decelerate, or turn the vehicle and output the same to the vehicle control system 100.

The non-driving operation components of the HMI 170 include a display device 82, a speaker 83, a touch operation detection device 84, a content player 85, various operation switches 86, a seat 88, a seat driving device 89, a glass window 90, a window driving device 91, an in-vehicle camera 95, a videoconferencing device 96, and an exterior display section 97.

The display device 82 is a liquid crystal display (LCD) or an organic electroluminescence (EL) display device and is attached to any section of the instrument panel or a proper place facing the front passenger's seat or a rear seat, for example. The display device 82 may be a head up display (HUD) projecting an image onto the front windshield or another window. The speaker 83 outputs audio. The touch operation detection device 84 detects the touch position in the display screen of the display device 82 and outputs the detected position to the vehicle control system 100 when the display device 82 is a touch panel. When the display device 82 is not a touch panel, the touch operation detection device 84 may be omitted.

The content player 85 includes a digital versatile disc (DVD) player, a compact disc (CD) player, a television receiver, or a device to generate various types of guidance images, for example. Each of the display device 82, speaker 83, touch operation detection device 84, and content player 85 may be partially or entirely shared with the navigation device 50.

The various operation switches 86 are provided at proper places in the compartment. The various operation switches 86 include an automated driving switch 87 which instructs to start (or to start in future) and stop automated driving. The automated driving switch 87 may be either a graphical user interface (GUI) switch or a mechanical switch. The various operation switches 86 may include switches to drive the seat driving device 89 and window driving device 91.

The seat 88 is a seat at which the vehicle occupant is seated. The seat driving device 89 freely drives the reclining angle, the position in the longitudinal direction, the yaw angle, and the like of the seat 88. The glass window 90 is provided for each door, for example. The window driving device 91 opens and closes the glass window 90.

The in-vehicle camera 95 is a digital camera using a solid-state imaging device such as a CCD or CMOS. The in-vehicle camera 95 is attached to such a position that the in-vehicle camera 95 takes an image of at least the head of the vehicle occupant performing driving operations, such as the rearview mirror, steering boss, or instrument panel. The camera 40 takes an image of the vehicle occupant periodically and repeatedly, for example.

The videoconferencing device 96 communicates with another videoconferencing device provided for the vehicle occupant's company or client's company. The videoconferencing device 96 includes a microphone that receives audio, a speaker that outputs audio, and the like, for example. The videoconferencing device 96 uses the communication device 55 to transmit and receive audio inputted from the user and images including the vehicle occupant taken by the in-vehicle camera 95. In this case, the communication device 55 connects to a network, such as the Internet, using a cellular network or the like to communicate with another videoconferencing device. The videoconferencing device 96 causes the display device 82 to display an image transmitted from another videoconferencing device or causes the speaker to output audio transmitted from another videoconferencing device.

The exterior display section 97 is provided on rear windshield glass or rear part of the vehicle M and displays an image. The exterior display section 97 shows information to surrounding vehicles, for example.

Prior to the description of the vehicle control system 100, the travel driving force output device 200, steering device 210, and brake device 220 are described.

The travel driving force output device 200 outputs to driving wheels, travel driving force (torque) allowing the vehicle to travel. The travel driving force output device 200 includes an engine, a transmission, and an engine electronic control unit (ECU) controlling the engine when the vehicle M is an automobile powered by an internal combustion engine, for example. The travel driving force output device 200 includes a travel motor and a motor ECU controlling the travel motor when the vehicle M is an electric vehicle powered by an electric motor. The travel driving force output device 200 includes an engine, a transmission, an engine ECU, a travel motor, and a motor ECU when the vehicle M is a hybrid vehicle. When the travel driving force output device 200 includes only the engine, the engine ECU adjusts the throttle opening of the engine, the shift position, and the like in accordance with information inputted from a later-described travel controller 160. When the travel driving force output device 200 includes only the travel motor, the motor ECU adjusts the duty ratio of PWM signal given to the travel motor in accordance with the information inputted from the travel controller 160. When the travel driving force output device 200 includes both the engine and travel motor, the engine ECU and motor ECU control the travel driving force in cooperation in accordance with the information inputted from the travel controller 160.

The steering device 210 includes a steering ECU and an electric motor, for example. The electric motor applies force to a rack and pinion mechanism to change the direction of steered wheels, for example. The steering ECU drives the electric motor in accordance with information inputted from the vehicle control system 100 or information on the inputted steering angle and steering torque to change the direction of the steered wheels.

The brake device 220 is an electric servo-brake device including a brake caliper, a cylinder transmitting hydraulic pressure to the brake caliper, an electric motor generating hydraulic pressure in the cylinder, and a braking controller. The braking controller of the electric servo brake device controls the electric motor in accordance with information inputted from the travel controller 160 so that each wheel is supplied with brake torque in response to the braking operation. As a backup, the electric motor servo brake device may include a mechanism which transmits hydraulic pressure generated by operation of the brake pedal to the cylinder through a master cylinder. The brake device 220 is not limited to the above-described electric servo brake device and may be an electronically-controlled hydraulic brake device. The electronically-controlled hydraulic brake device controls an actuator in accordance with information inputted from the travel controller 160 to transmit the hydraulic pressure of the master cylinder to the cylinder. The brake device 220 may include a regenerative brake by the travel motor which can be included in the travel driving force output device 200.

[Vehicle Control System]

The vehicle control system 100 is described below. The vehicle control system 100 is implemented by one or more processors or hardware having functions equivalent thereto, for example. The vehicle control system 100 may be a combination of electronic control units (ECUs) including a processor such as a central processing unit (CPU), a storage device, and a communication interface connected through an internal bus, micro-processing units (MPUs), or the like.

Back to FIG. 2, the vehicle control system 100 includes the target lane determination section 110, automated driving controller 120, travel controller 160, HMI controller 170, and storage 180, for example. The automated driving controller 120 includes an automated driving mode controller 130, a vehicle position recognizing section 140, an outside recognizing section 142, an action plan generating section 144, a trajectory generating section 146, a switching controller 150, for example. Some or all of the target lane determination section 110, each section of the automated driving controller 120, HMI controller 170, and travel controller 160 are implemented by a processor executing a program (software). Alternatively, some or all of the same may be implemented by hardware such as large scale integration (LSI) or application specific integrated circuit (ASIC) or may be implemented by a combination of software and hardware.

The storage 180 stores information including high-precision map information 182, target lane information 184, action plan information 186, and mode-based restriction information 188, for example. The storage 180 is implemented by a read only memory (ROM), a random access memory (RAM), a hard disk drive (HDD), a flash memory, and the like. The program executed by the processor may be stored in the storage 180 in advance or may be downloaded from an external device through in-vehicle Internet equipment or the like. The program may be installed in the storage 180 by inserting a portable storage medium storing the program into a drive device. The vehicle control system 100 may be distributed to plural computer devices.

The target lane determination section 110 is implemented by a MPU, for example. The target lane determination section 110 divides the route provided from the navigation device 50 into plural blocks and determines the target lane for each block with reference to the high-precision map information 182. The target lane determination section 110 divides the route every 100 m in the vehicle travel direction, for example. For example, the target lane determination section 110 determines that the vehicle is to travel the second lane from the left. When the route includes a diverging point, a merging point, or the like, for example, the target lane determination section 110 determines the target lanes such that the vehicle M can travel in a reasonable route for safely passing the diverging point, the merging point, or the like toward the destination. The target lane determined by the target lane determination section 110 is stored in the storage 180 as the target lane information 184.

The high-precision map information 182 is map information more precise than the navigation map of the navigation device 50. The high-precision map information 182 includes information on the center of each lane or boundaries thereof, for example. The high-precision map information 182 may include road information, traffic control information, address information (addresses and zip codes), facility information, telephone number information, and the like. The road information may include information representing types of roads such as freeways, toll roads, national highways, and prefectural roads, the number of lanes of each road, the width of each lane, the road gradient, the position of each road (three-dimensional coordinates including the longitude, latitude, and altitude), the curvature of each curve, positions of merging and diverging points in each lane, and road signs. The traffic control information includes information on lanes blocked due to construction, traffic accidents, traffic jam, and the like.

The automated driving mode controller 130 determines the mode of automated driving carried out by the automated driving controller 120. The mode of automated driving in the embodiment includes the following modes. The following modes are shown just by way of example, and the number of modes of automated driving may be determined properly.

[Mode A]

Mode A is a mode in which the automated driving degree is the highest. When Mode A is in execution, every vehicle control, including complicated merge control, is autonomously conducted, and it is unnecessary for the vehicle occupant to keep watch on the circumstance around the vehicle M and the state of the vehicle M.

[Mode B]

Mode B is a mode in which the automated driving degree is the next highest to Mode A. When Mode B is in execution, every vehicle control is autonomously conducted in principle, but the driving operation of the vehicle M is handed over to the vehicle occupant in some situations. It is therefore necessary for the vehicle occupant to keep watch on the circumstances around the vehicle M and the state of the vehicle M.

[Mode C]

Mode C is a mode in which the automated driving degree is the next highest to Mode B. When Mode C is in execution, the vehicle occupant needs to perform confirmation operation for the HMI 70 in accordance with the situation. In Mode C, automatic lane change is conducted when the vehicle occupant is notified of the time to change lanes and performs operation to change lanes for the HMI 70, for example. It is therefore necessary for the vehicle occupant to keep watch on the circumstances around the vehicle M and the state of the vehicle M.

The automated driving mode controller 130 determines the mode of automated driving based on the instruction from an action plan changing section 145, which is included in the action plan generating section 144, an operation by the vehicle occupant for the HMI 70, an event determined by the action plan generating section 144, the traveling style determined by the trajectory generating section 146, and the like. The mode of automated driving is provided to the HMI controller 170. There may be limitations set on the modes of automated driving depending on the capabilities of the detection device DD of the vehicle M or the like. When the detection device DD has low capabilities, Mode A is not executed, for example. Any mode of automated driving can be switched to a manual driving mode through an operation for a driving operation component in the HMI 70 (override).

The vehicle position recognizing section 140 of the automated driving controller 120 recognizes the lane where the vehicle M is traveling (traveling lane) and the relative position of the vehicle M to the travel lane based on the high-precision map information 182 stored in the storage 180 and information inputted from the finders 20, radars 30, camera 40, navigation device 50, or vehicle sensor 60.

The vehicle position recognizing section 140 recognizes the travel lane by comparing the pattern of road lines recognized from the high-precision map information 182 with the pattern of road lines around the vehicle M recognized from the image taken by the camera 40. The recognition may be performed considering the position of the vehicle M acquired from the navigation device 50 and the results of processing by INS.

Figure 4:
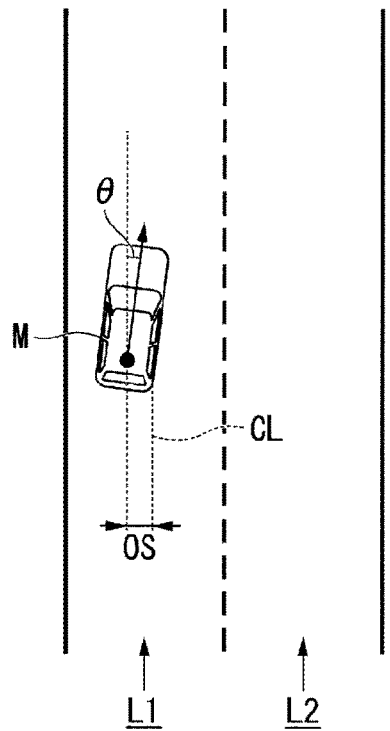
FIG. 4 is a view illustrating the way the relative position of the control system-mounted vehicle to a travel lane is recognized by a system-mounted vehicle position recognizing section.

FIG. 4 is a diagram illustrating how the relative position of the vehicle M to a travel lane L1 is recognized by the vehicle position recognizing section 140. As the relative position of the vehicle M to the travel lane L1, the vehicle position recognizing section 140 recognizes a deviation OS of the reference point (the center of gravity, for example) of the vehicle from the center CL of the travel lane L1 and an angle θ between the direction of travel of the vehicle M and the center CL of the travel lane L1. Instead of the aforementioned recognition, the vehicle position recognizing section 140 may recognize the position of the reference point of the vehicle M relative to any side edge of the travel lane L1 as the relative position of the vehicle M to the travel lane L1. The relative position of the vehicle M recognized by the vehicle position recognizing section 140 is provided to the target lane determination section 110.

The outside recognizing section 142 recognizes the positions of surrounding vehicles and conditions of the surrounding vehicles such as speed and acceleration based on information inputted from the finders 20, radars 30, camera 40, and the like. The surrounding vehicles refer to vehicles which are traveling around the vehicle M in the same direction as the vehicle M, for example. The position of each surrounding vehicle is represented by a representative point thereof, such as the center of gravity or corners of the vehicle or may be represented by a region expressed in the vehicle's outline. The conditions of each surrounding vehicle may include information on the acceleration of the same and whether the vehicle of interest is changing lanes or is going to change lanes. Such information is known based on the information from the above described various devices. In addition to the surrounding vehicles, the outside recognizing section 142 may recognize the positions of guardrails, telephone poles, parked vehicles, pedestrians, and other objects.

The action plan generating section 144 set the starting point of automated driving and/or the destination of the same. The starting point of automated driving may be the current position of the vehicle M or the position where the operation to start automated driving is performed. The action plan generating section 144 generates an action plan for a zone between the starting point and destination of automated driving. Alternatively, the action plan generating section 144 may generate an action plan for an arbitrary section.

The action plan is composed of plural events which are executed sequentially, for example. The events include: a deceleration event that decelerates the vehicle M; an acceleration event that accelerates the vehicle M; a lane keeping event that causes the vehicle M to travel in the current travel lane; a lane changing event that causes the vehicle M to change lanes; an overtaking event that causes the vehicle M to overtake the vehicle traveling ahead; a diverging event that causes the vehicle M to move to a desired lane at a diverging point or keeps the vehicle M traveling in the current travel lane; a merging event that causes the vehicle M to accelerate or decelerate in a merging lane, which merges into a main lane, to move to the main lane; and a handover event that changes the driving mode from the manual driving mode to the automated driving mode at the starting point of automated driving and from the automated driving mode to the manual driving mode at the scheduled end point of automated driving. The action plan generating section 144 sets a lane changing event, a diverging event, or a merging event at a place where the target lane determined by the target lane determination section 110 is changed. The information indicating the action plan generated by the action plan generating section 144 is stored in the storage 180 as the action plan information 186.

Figure 5:
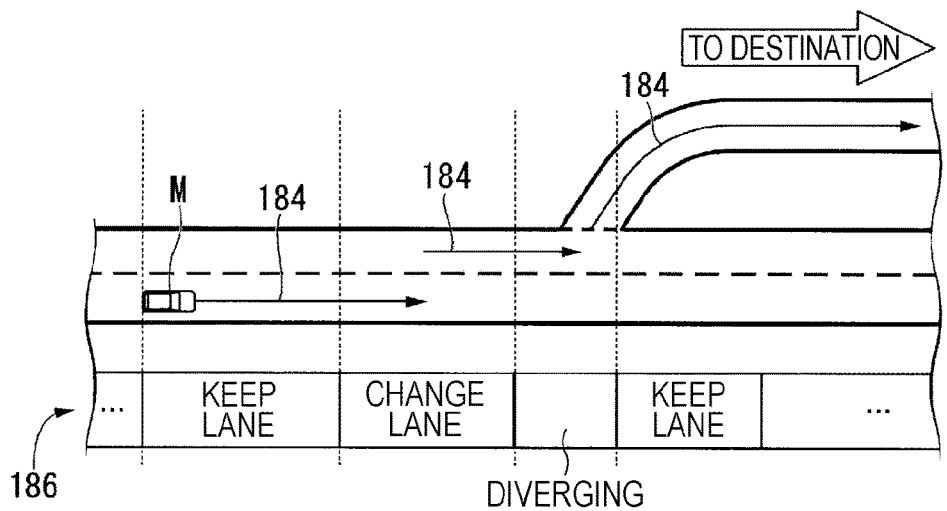
FIG. 5 is a view illustrating an example of an action plan generated for a certain zone.

FIG. 5 is a diagram illustrating an example of action plans generated for a certain section. As illustrated in FIG. 5, the action plan generating section 144 generates an action plan necessary for the vehicle M to travel through the target lane indicated by the target lane information 184. The action plan generating section 144 may dynamically change the action plan independently of the target lane information 184 as the situations of the vehicle M changes. For example, the action plan generating section 144 changes the event set for a block where the vehicle M is scheduled to travel when the speed of one of the surrounding vehicles recognized by the outside recognizing section 142 exceeds a threshold value while the vehicle M is traveling or when a surrounding vehicle traveling in the lane next to the travel lane of the vehicle M moves toward the travel lane of the vehicle M. In an action plan configured so that the lane changing event is executed after the lane keeping event, for example, when a vehicle is recognized travelling from behind at a speed higher than the threshold value in the lane to which the vehicle is scheduled to move, the action plan generating section 144 may change the event subsequent to the lane keeping event from the lane changing event to the deceleration event, lane keeping event, or the like. The vehicle control system 100 therefore allows the vehicle M to autonomously travel safely even when the external situation has changed.

The action plan changing section 145 changes the plan of automated driving based on any factor independent of the travel requirements for the vehicle M to travel by autonomously driving along the route to the destination. The "travel requirements" refer to conditions concerning the vehicle's travel, typically, predetermined requirements relating to the automated driving operation of the vehicle which are determined or selected in view of economical or technical conditions therefor, such that the vehicle M is required to travel to the destination quickly at low fuel consumption or to avoid traffic jams, for example. In one embodiment, a "factor independent of travel requirements" may include any factors which are not determined or selected depending on the requirements for automated driving operation, but determined or selected depending on intentions, plans, activities, etc. of vehicle's occupants, without regard to the requirements for automated driving operation, such as viewing of informational or entertaining contents, participating a videoconference, etc. Changing the plan of automated driving include some or all of: changing an action plan generated by the action plan generating section 144; changing the mode of automated driving determined by the automated driving mode controller 130; changing the route to the destination calculated by the navigation device 50; and changing the target lane determined by the target lane determination section 110. The process of the action plan changing section 145 is described later in detail.

In some of the aforementioned modes of automated driving, the content player 85 and videoconferencing device 96 are disabled. When the content player 85 or videoconferencing device 96 is selected for use, the action plan changing section 145 causes the automated driving mode controller 130 to change the mode of automated driving to enable the content player 85 or videoconferencing device 96. The action plan changing section 145 causes the automated driving mode controller 130 to change the mode of automated driving to Mode A, for example. Mode A includes a slow following travel (a traveling style in which the vehicle M travels following the vehicle ahead at a predetermined speed or lower), for example. The action plan changing section 145 maintains the slow following travel to maintain Mode A. While Mode A is being maintained, the vehicle occupant can use the content player 85 and videoconferencing device 96.

Figure 6:
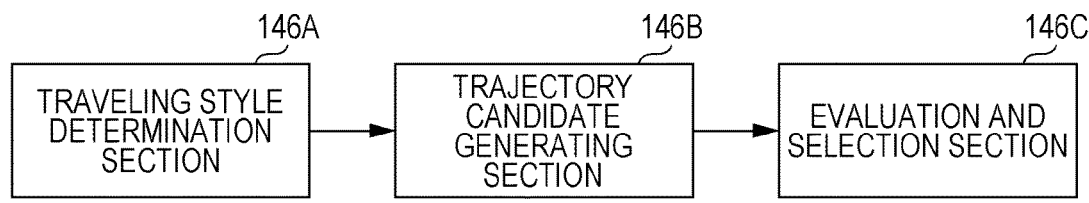
FIG. 6 is a diagram illustrating an example of the configuration of a trajectory generating section.

FIG. 6 is a diagram illustrating an example of the configuration of the trajectory generating section 146. The trajectory generating section 146 includes a travelling style determination section 146A, a trajectory candidate generating section 146B, and an evaluation and selection section 146C, for example.

The travelling style determination section 146A determines the travelling style to be any one of constant speed travel, following travel, slow following travel, deceleration travel, curve travel, obstacle avoiding travel and the like. When there are no other vehicles in front of the vehicle M, the travelling style determination section 146A sets the travelling style to the constant speed travel. To cause the vehicle M to travel following the vehicle ahead, the travelling style determination section 146A sets the travelling style to the following travel. In a traffic jam or the like, the travelling style determination section 146A sets the travelling style to the slow following vehicle. The travelling style determination section 146A sets the travelling style to the deceleration travel when the vehicle in front of the vehicle M is recognized decelerating by the outside recognizing section 142 or when an event that stops or parks the vehicle M is to be executed. When it is recognized by the outside recognizing section 142 that the vehicle M is entering a curve, the travelling style determination section 146A sets the travelling style to the curve travel. When an obstacle is recognized in front of the vehicle M by the outside recognizing section 142, the travelling style determination section 146A sets the travelling style to the obstacle avoiding travel.

At the process of executing the lane changing event, overtaking event, diverging event, merging event, handover event, or the like, the travelling style determination section 146A determines the travelling style in accordance with the respective events.

Figure 7:
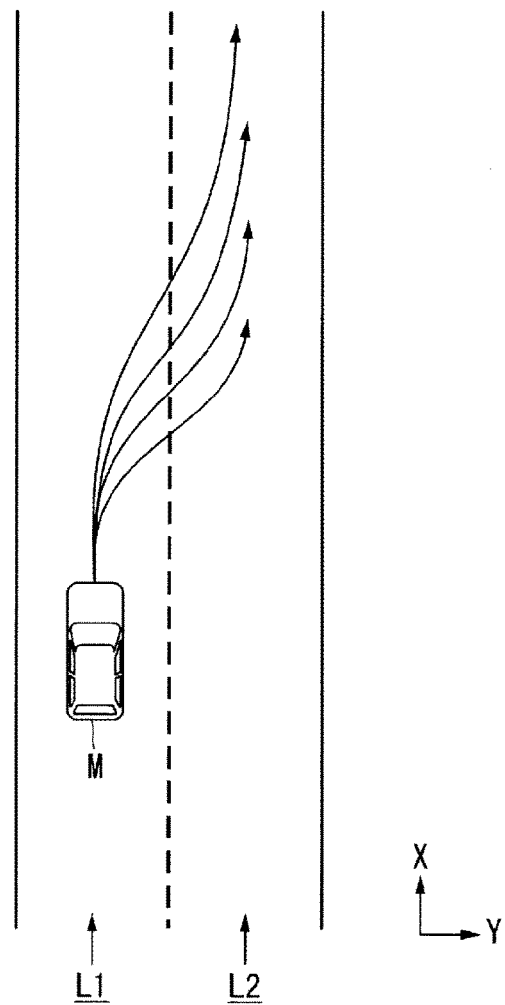
FIG. 7 is a view illustrating an example of trajectory candidates generated by a trajectory candidate generating section.

The trajectory candidate generating section 146B generates a trajectory candidate based on the travelling style determined by the travelling style determination section 146A. FIG. 7 is a diagram illustrating examples of the trajectory candidate generated by the trajectory candidate generating section 146B. FIG. 7 illustrates trajectory candidates generated when the vehicle M is scheduled to move from a lane L1 to a lane L2.

Figure 8:
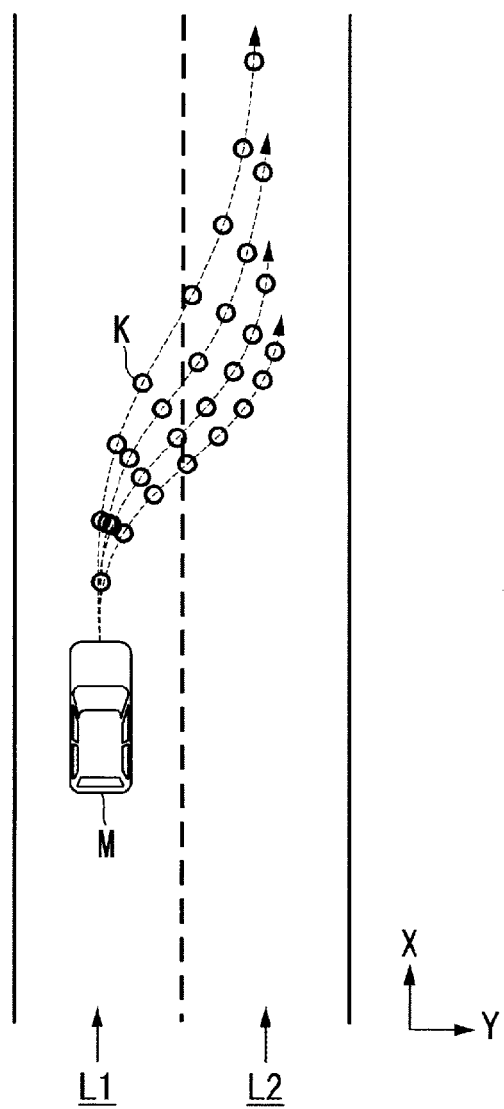
FIG. 8 is a view illustrating trajectory candidates generated by the trajectory candidate generating section with trajectory points K.

The trajectory candidate generating section 146B determines a trajectory (as illustrated in FIG. 7) as a group of target positions (trajectory points K) that the reference position (the center of gravity or the center of the rear wheel axis) of the vehicle M is to reach at predetermined intervals in future. FIG. 8 is a diagram illustrating trajectory candidates generated by the trajectory candidate generating section 146B with the trajectory points K. The wider the intervals of the trajectory points K, the higher the speed of the vehicle M. The narrower the intervals of the trajectory points K, the lower the speed of the vehicle M. The trajectory candidate generating section 146B therefore gradually increases the intervals of the trajectory points K in order to accelerate the vehicle M and gradually reduces the intervals of the trajectory points K in order to decelerate the vehicle M.

Since each trajectory point K includes a speed component as described above, the trajectory candidate generating section 146B needs to give target speed to each trajectory point K. The target speed is determined in accordance with the travelling style determined by the travelling style determination section 146A.

Figure 9:
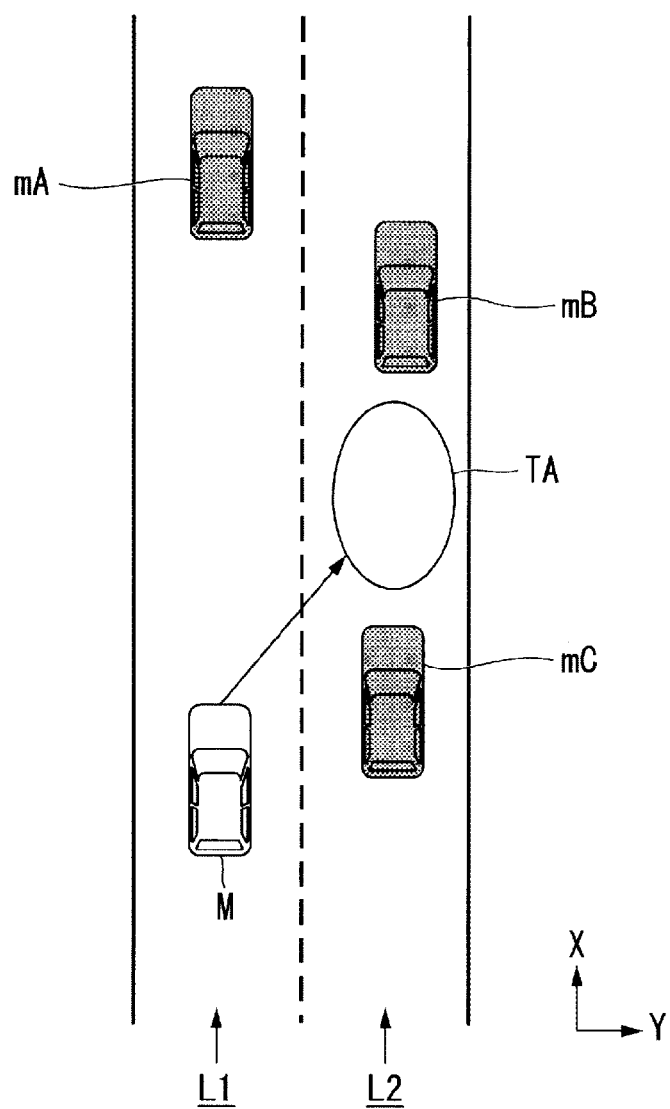
FIG. 9 is a view illustrating a lane change target position.

Herein, a description is given of a method of determining the target speed in the process of lane change (including diverging). The trajectory candidate generating section 146B first sets a lane change target position (or a marge target position). The lane change target position is set as a relative position to surrounding vehicles and determines which surrounding vehicles the vehicle M is to move between. The trajectory candidate generating section 146B determines the target speed at changing lanes based on the lane change target position in relation to three surrounding vehicles. FIG. 9 is a diagram illustrating the lane change target position TA. In FIG. 9, L1 indicates the lane where the vehicle M is traveling while L2 indicates the adjacent lane. The surrounding vehicle traveling just in front of the vehicle M is defined as a preceding vehicle mA. The surrounding vehicle traveling just in front of the lane change target position Ta is defined as a front reference vehicle mB. The surrounding vehicle traveling just behind the lane change target position Ta is defined as a rear reference vehicle mC. The vehicle M needs to accelerate or decelerate in order to move to the side of the lane change target position. In this process, it is necessary to prevent the vehicle M from reaching the preceding vehicle mA. The trajectory candidate generating section 146B therefore predicts the situation of the three surrounding vehicles in future and determines the target speed so that the vehicle M does not interfere with the surrounding vehicles.

Figures 10, 11:
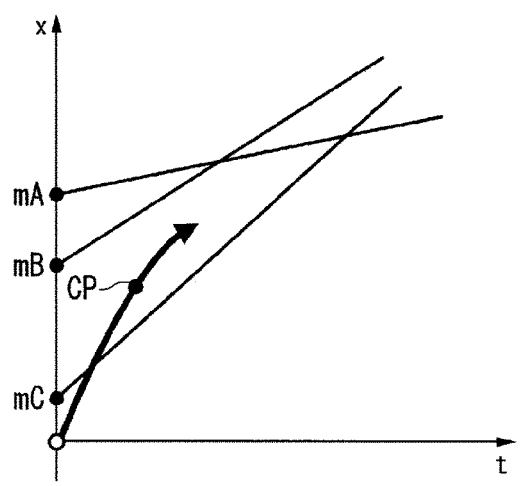
FIG. 10 is a diagram illustrating a speed generation model on the assumption that that three surrounding vehicles are moving at constant speed.
FIG. 11 is a table illustrating an example of mode-based restriction information.

FIG. 10 is a diagram illustrating a speed generation model based on the assumption that the three surrounding vehicles travel at constant speeds. In FIG. 10, the straight lines extending from mA, mB, and mC represent displacement in the travel direction on the assumption that the three surrounding vehicles travel at constant speeds. The vehicle M must be located between the front and rear reference vehicles mB and mC at a point CP where the vehicle M completes the lane change and must be located behind the preceding vehicle mA before the point CP. Under such restrictions, the trajectory candidate generating section 146B develops plural time-series patterns of the target speed to the end of the lane change. The trajectory candidate generating section 146B develops plural trajectory candidates as illustrated in FIG. 8 by applying a model, such as a spline curve, to the time-series patterns of the target speed. The motion patterns of the three surrounding vehicles may be predicted on the assumption that the three surrounding vehicles travel at constant speed as illustrated in FIG. 10 but also on the assumption that the three surrounding vehicles travel at constant acceleration or constant jerk.

The evaluation and selection section 146C evaluates the trajectory candidates generated by the trajectory candidate generating section 146B from two viewpoints of planning and safety, for example, and selects a trajectory to be outputted to the travel controller 160. From the viewpoint of planning, the evaluation and selection section 146C gives a high rating to a trajectory which is compatible with a plan already generated (an action plan, for example) and has a short length. For example, to move to the right lane, the evaluation and selection section 146C does not give a lower rating to a trajectory of the vehicle M which involves moving to the left lane and then returning to the right lane. From the viewpoint of safety, the evaluation and selection section 146C gives a higher rating to such a trajectory that the vehicle is more distant from an object (the surrounding vehicles or the like) at each trajectory point with fewer changes in acceleration, deceleration, and steering angle.

The switch controller 150 mutually switches between the automated driving mode and manual driving mode based on a signal inputted from the automated driving switch 87. The switching controller 150 switches from the automated driving mode to the manual driving mode based on operations for the driving operation components of the HMI 70 to make an instruction to accelerate, decelerate, or steer the vehicle M. When the amount of operation indicated by a signal inputted from the driving operation components of the HMI 70 has continued to exceed the threshold value for a reference period of time or more, the switching controller 150 switches the driving mode from the automated driving mode to the manual driving mode (override). The switching controller 150 may restore the vehicle M to the automated driving mode when no operation for the driving operation components of the HMI 70 is detected for a predetermined period of time after switching to the manual driving mode for override.

The travel controller 160 controls the travel driving force output device 200, steering device 210, and brake device 220 so that the vehicle M passes along the trajectory generated by the trajectory generating section 146 as scheduled.

The HMI controller 170 (a factor acquisition section) controls the HMI 70 depending on the type of the automated driving mode with reference to the mode-based restriction information 188 when notified by the automated driving controller 120 of information on the mode of automated driving.

FIG. 11 is a diagram illustrating an example of the mode-based restriction information 188. The mode-based restriction information 188 illustrated in FIG. 11 includes manual driving mode and automated driving mode as items of the driving mode. The automated driving mode includes Mode A, Mode B, and Mode C as described above. As items of non-driving operation, the mode-based restriction information 188 includes navigation operation which is operation for the navigation device 50, content play operation which is operation for the content player 85, and instrument panel operation which is operation for the display device 82. In the example of the mode-based restriction information 188 illustrated in FIG. 11, whether the vehicle occupant is allowed to operate each non-driving operation component is set based on the driving mode described above. However, the target interface devices are not limited to the aforementioned non-driving operation components.

The HMI controller 170 refers to the mode-based restriction information 188 based on the mode information acquired from the automated driving controller 120 and determines enabled devices (the navigation device 50 and a part or all of the HMI 70) and disabled devices. Based on the determination result, the HMI controller 170 controls whether to accept the occupant's operation for the non-driving operation components of the HMI 70 or the navigation device 50.

When the driving mode executed by the vehicle control system 100 is the manual driving mode, for example, the vehicle occupant operates the driving operation components (the accelerator pedal 71, brake pedal 74, shifter 76, and steering wheel 78) of the HMI 70. When the driving mode executed by the vehicle control system 100 is Mode B or Mode C of the automated driving mode, for example, the vehicle occupant is required to observe the surroundings of the vehicle M. In such a case, to prevent the vehicle occupant from being distracted by an action (operation for the HMI 70, for example) other than driving, the HMI controller 170 makes a control so that operations for some or all of the non-driving operation components of the HMI 70 are disabled. In this process, in order to cause the vehicle occupant to observe the surroundings of the vehicle M, the HMI controller 170 may cause the display device 82 to display surrounding vehicles recognized around the vehicle M by the outside recognizing section 142 and the conditions of the surrounding vehicles in an image and allow the HMI 70 to accept a confirmation operation depending on the situation of the traveling vehicle M.

When the driving mode is Mode A of the automated driving mode, the HMI controller 170 makes a control to relax the restrictions concerning the driver distraction and allow the non-driving operation components of the HMI 70, which are not allowed to be operated in the other modes, to accept occupant's operations. For example, the HMI controller 170 causes the display device 82 to display video, causes the speaker 83 to output audio, and causes the content player 85 to play contents from a DVD or the like. The HMI controller 170 also permits use of the videoconferencing device 96. The contents which are played by the content player 85 may include various types of contents concerning entertainment such as TV programs as well as contents stored in DVDs and the like. The "content play operation" illustrated in FIG. 11 may also include content operation concerning such entertainment.

The HMI controller 170 acquires a factor independent of the travel requirements of the vehicle M which autonomously travels along the route to the destination. Examples of the factor include a schedule of a particular action that the vehicle occupant may perform in the vehicle M if the vehicle M travels autonomously and a target arrival time at which the vehicle occupant wants to arrive at the destination. The particular action is viewing of contents, participation in a videoconference, or the like, for example.

[Process Based on Particular Action]

Hereinafter, a description is given of a process executed by the action plan changing section 145. The vehicle control system 100 adjusts the duration of automated driving to the expected end time of a particular action. In this process, it is assumed that automated driving mode continues to the destination. In the case where the automated driving mode is switched to the manual driving mode before the destination, the vehicle control system 100 changes the plan of automated driving so that the automated driving mode is switched to the manual driving mode after the expected end time of the particular action.

Figure 12:
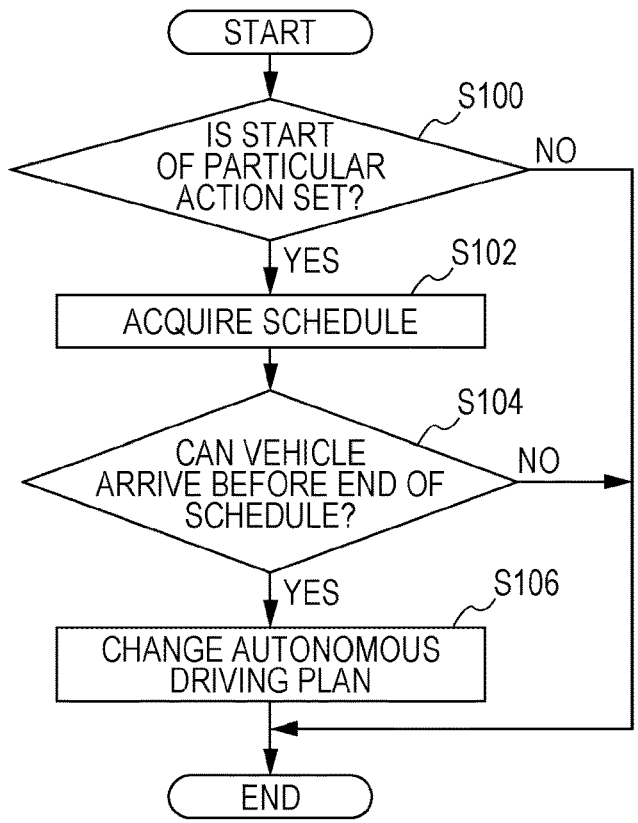
FIG. 12 is a flowchart illustrating a flow of the process to change the action plan based on a particular action.

FIG. 12 is a flowchart illustrating a flow of the process to change the plan of automated driving based on the particular action. First, the action plan changing section 145 determines whether the particular action is set to start (step S100). The setting to start the particular action includes a setting operation to immediately start the particular action and a setting operation (a booking operation) to start the particular action at a particular time in future.

Figure 13:
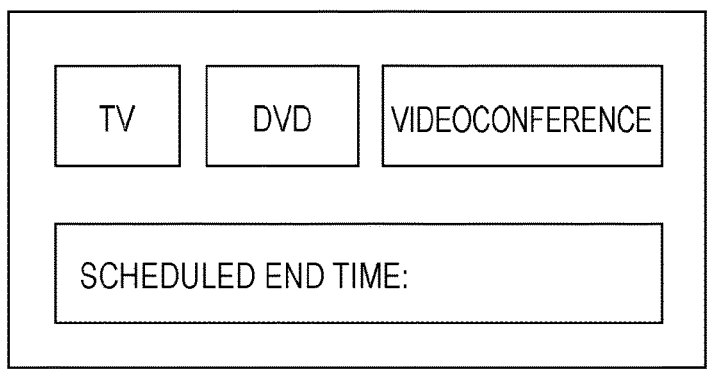
FIG. 13 is a view illustrating an example of GUI switches displayed by a display device.

The display device 82 displays a GUI switch used to select various types of actions, for example. FIG. 13 is a view illustrating an example of the GUI switch displayed by the display device 82. The display device 82 displays a menu of various types of actions. The various types of actions include TV viewing, DVD viewing, and participation in a videoconference, for example. The vehicle control system 100 determines that some or all of these actions are the particular action.

The HMI controller 170 may cause the display device 82 to display a GUI switch by which the vehicle occupant inputs the expected end time of each action. When the expected end time of the particular action among the various types of actions is inputted and the inputted information is detected by the touch operation detection device 84 and is outputted to the automated driving controller 120, the automated driving controller 120 changes the plan of automated driving so that the vehicle M arrive at the destination after the expected end time of the particular action. Instead of the expected end time of each of the various types of actions, a scheduled duration of each action may be inputted. The scheduled duration of each action refers to information indicating that the action is to end within "X" minutes or "X" hours after a certain time.

When a particular action is set to start, the action plan changing section 145 acquires the schedule of the set particular action (step S102).

Figures 14, 15:
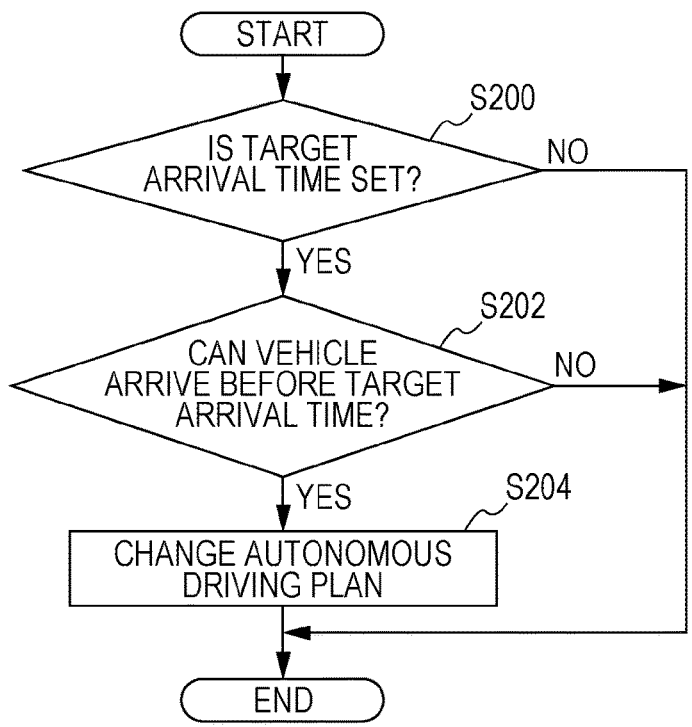
FIG. 14 is a diagram illustrating an example of the image displayed when TV viewing is selected.
FIG. 15 is a flowchart illustrating a flow of the process in which an action plan changing section changes a plan of automated driving based on target arrival time.

When the vehicle occupant selects an action from the menu displayed by the display device 82, for example, the display device 82 displays a screen corresponding to the selected action. FIG. 14 is a view illustrating an example of the image displayed when television viewing is selected. Based on the information acquired by the content player 85, the display device 82 displays information including programs, start and end times of the programs, and TV stations in association with each other as illustrated in FIG. 14. When the vehicle occupant selects a preferable program, the expected end time of the selected program is set as the expected end time of the particular action.

When DVD viewing is selected from the menu in the above-described example, the action plan generating section 144 acquires the content play time of a DVD from the content player 85 and calculates the expected end time of the particular action based on the acquired play time and the current time. The action plan generating section 144 changes the plan of automated driving so that the vehicle M arrive at the destination after viewing of the entire contents of the DVD or a desired chapter thereof. Herein, the vehicle occupant determines whether to watch all of the contents or watch a desired chapter thereof, for example.

When participation in a videoconference is selected from the menu in the above-described example, the action plan generating section 144 changes the plan of automated driving so that the vehicle M arrive at the destination after the expected end time of the conference which is inputted by the vehicle occupant.

In this process, the automated driving mode controller 130 may maintain the automated driving mode that permits the particular action or may change the driving mode to the automated driving mode that permits the particular action.

Next, the action plan changing section 145 determines whether the vehicle M can arrive at the destination before the end of the acquired schedule of the particular action (step S104). The action plan changing section 145 performs the determination of the step S104 by comparing the expected end time of the particular action acquired from the schedule of the particular action with the expected arrival time calculated from the plan of automated driving generated by the action plan generating section 144. The expected arrival time is obtained based on information including average speed for each travel route acquired from an external device through the communication device 55, the position of the vehicle M, and the remaining distance to the destination.

The action plan changing section 145 changes the plan of automated driving when the vehicle M is estimated to arrive at the destination before the end of the schedule of the particular action (step S106). The action plan changing section 145 changes the plan of automated driving based on the expected end time of the particular action, for example. The vehicle M is therefore scheduled to arrive at the destination after the program that the user wants to watch is finished. This can widen the range of usages of the vehicle M based on the occupant's intention.

On the other hand, when the particular action is not set to start or when it is determined that the vehicle M cannot arrive at the destination before the particular action is finished, the process of the flowchart is terminated.

The HMI controller 170 may control a compartment communication device to control a terminal brought by the vehicle occupant (driver), in the same manner as the videoconferencing device 96.

The HMI controller 170 acquires from the automated driving controller 120, information that the plan of automated driving is being changed based on the particular action and causes the exterior display device 97 to display information based on the acquired information. For example, the exterior display device 97 displays information prompting the surrounding vehicles to overtake the vehicle M. Specifically, the exterior display device 97 displays information such as "We are driving at low speed to delay arrival time. Please go ahead." It is therefore possible to let the surrounding vehicles know that the vehicle M is adjusting the time of arrival at the destination. In addition or instead, the exterior display device 97 may display information representing the contents of the particular action.

The HMI controller 170 may transmit to other vehicles through wireless communication using the communication device 55, the information that the plan of automated driving is being changed based on the particular action. When a surrounding vehicle receives the information, the information that the plan of automated driving is being changed based on the particular action is displayed by a display device mounted on the surrounding vehicle. The vehicle occupant of the surrounding vehicle can overtake the vehicle M by recognizing that the plan of automated driving of the vehicle M is being changed.

[Process Based on Target Arrival Time]

The vehicle control system 100 may control the speed of the vehicle M or perform detour control so as to delay the arrival of the vehicle M at the destination when the vehicle M is estimated to arrive at the destination before the target arrival time set by the vehicle occupant. The vehicle occupant sets the target arrival time to minimize the amount of waiting time after arrival (in the case that the occupant is to meet someone at the target arrival time, for example). The vehicle occupant also sets the target arrival time in order to arrive at the destination after the various types of actions. The various types of actions include looking out of the vehicle, the aforementioned particular actions, and the like.

FIG. 15 is a flowchart illustrating a flow of the process to change the plan of automated driving based on the target arrival time. The process is an example of the process performed when the target arrival time is set before the vehicle M starts to travel from the starting point.

The action plan changing section 145 first determines whether the target arrival time is set (step S200). The display device 82 displays a GUI switch with which the vehicle occupant inputs the target arrival time, for example. When the vehicle occupant inputs the target arrival time, information on the inputted target arrival time is outputted to the action plan changing section 145.

When the target arrival time is set, the action plan changing section 145 determines whether the vehicle M can arrive at the destination before the set target arrival time (step S202). When the vehicle M is estimated to arrive at the destination before the set target arrival time, the action plan changing section 145 changes the plan of automated driving based on the set destination and target arrival time (step S204). When the target arrival time is not set or when the vehicle M cannot arrive at the destination before the target arrival time, the process of the flowchart is terminated.

[Modification of Process Based on Target Arrival Time]

When the vehicle M is arriving at the destination before the target arrival time set by the vehicle occupant and it is determined that there is a parking area where the vehicle M can be parked in the destination, the vehicle control system 100 may make a control so that the vehicle M is parked in a parking area of the destination without performing speed control of the vehicle M or detour control.

Figure 16:
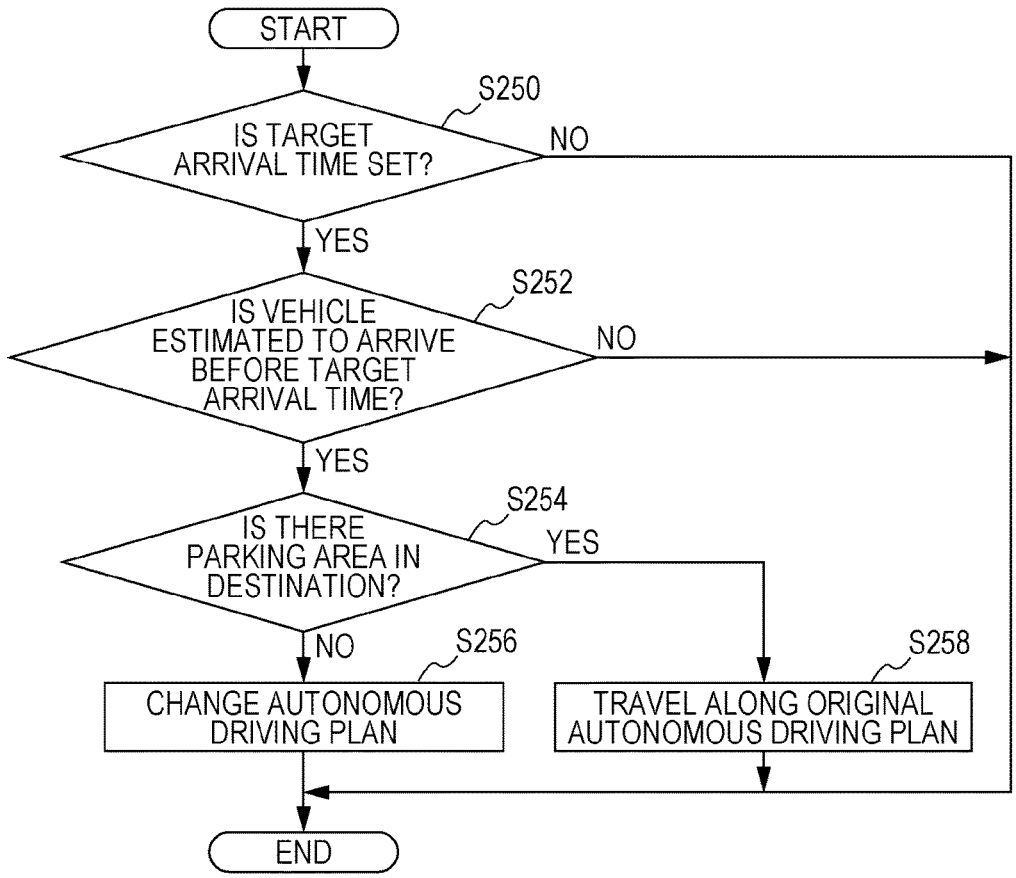
FIG. 16 is a flowchart illustrating another example of the flow of the process in which the action plan changing section changes a plan of automated driving based target arrival time.

FIG. 16 is a flowchart illustrating another example of the process to change the plan of automated driving based on the target arrival time. The process is an example of the process executed when the target arrival time is set before the vehicle M starts to travel from the starting point.

The action plan changing section 145 determines whether the target arrival time is set (step S250). When the target arrival time is set, the action plan changing section 145 determines whether the vehicle M can arrive at the destination before the set target arrival time (step S252). When the target arrival time is not set or when the vehicle M cannot arrive at the destination before the target arrival time, the process of the flowchart is terminated.

When the vehicle M is estimated to arrive at the destination before the set target arrival time, the action plan changing section 145 determines whether there is a parking area where the vehicle M can be parked near the set destination (step S254). The determination whether there is a parking area is performed based on information stored in the high-precision map information 182 or information transmitted from another device and received by the communication device 55. It is determined that there is a parking area when there is a rest area at the destination or when there is an area large enough to park the vehicle M in the road shoulder near the destination and parking in the area is not restricted.

When there is no parking area around the destination, the action plan changing section 145 changes the plan of automated driving based on the set destination and target arrival time so that the vehicle M arrive at the destination at the target arrival time (step S256).

On the other hand, when there is a parking area around the destination, the vehicle control system 100 causes the vehicle M to travel along the original plan of automated driving and park the vehicle M in the parking area (step S258). In this case, the vehicle occupant of the vehicle M can perform the particular action such as content viewing within the parked vehicle M.

When there is a parking area in the step S254, the process to cause the vehicle M to travel along the original plan of automated driving and park the vehicle M in the parking area may be executed after it is determined that the vehicle M is estimated to arrive at the destination before the end of the acquired schedule of the particular action in the step S104 of FIG. 12. The vehicle occupant can perform the particular action in the parking area of the destination even when the vehicle M arrives at the destination before the expected end time of the particular action. Accordingly, the vehicle control system 100 prevents the vehicle M from arriving very late at the destination due to an unexpected traffic jam or the like when the vehicle control system 100 delays the arrival time at the destination, for example.

[Example of Changing Plan of Automated Driving by Speed Control]

Figure 17:
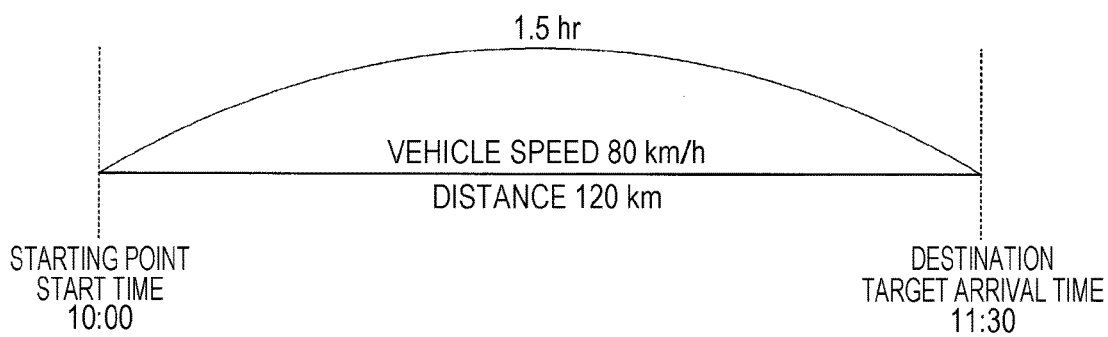
FIG. 17 is a diagram for explaining the process to control the vehicle M based on expected end time of a particular action or the target arrival time.

FIG. 17 is a diagram for explaining the process in which the vehicle M is controlled based on the expected end time of the particular action or target arrival time. If the target arrival time is not set, the vehicle M travels along a plan of automated driving. In the plan of automated driving, the vehicle M travels at the speed limit. When the distance from the starting place to the destination is 120 km and the speed limit of the road that the vehicle M travels to the destination is 120 km/h, the vehicle M arrives at the destination within one hour in such instances that the embodiment is not applied.

In the embodiment, when the target arrival time is set, the plan of automated driving can be changed so that the vehicle M arrive at the destination at the target arrival time. When the start time is 10:00 and the target arrival time is 11:30, for example, the plan of automated driving is changed so that the vehicle M travel the road at 80 km/h. The vehicle M therefore arrives at the target arrival time.

As described above, the action plan changing section 145 changes the plan of automated driving so that the vehicle M arrive at the destination at the target arrival time.

[Example of Changing Plan of Automated Driving by Mode Change]

The process to change the mode of automated driving is included in "the idea of changing the plan of automated driving". The automated driving controller 120 may cause the automated driving mode controller 130 to determine the mode of automated driving based on the particular action.

The automated driving mode controller 130 changes the mode of automated driving when the vehicle M is estimated to arrive at the destination before the end of the schedule of the particular action (before DVD viewing is finished, for example) or before the set target arrival time. The automated driving mode controller 130 changes the mode of automated driving to the mode involving low-speed travel (the travelling style with a predetermined speed of lower), low-speed following travel, or the like, for example.

Example 1 of Automated Driving Plan Changed by Action Plan Changing Section

As an example of changing the automated driving plan, the action plan changing section 145 changes the action plan to an event that causes the vehicle M to travel at low speed. In this example, it is assumed that the target arrival time is set. FIGS. 18A and 18B are views illustrating an example how the action plan is changed. The action plan is changed when the vehicle M is traveling based on the lane keeping event and the target arrival time is set, for example. The action plan is changed to the slow travel event as illustrated in FIG. 18B in the case where the vehicle M is estimated to arrive at the destination before the target arrival time if the lane keeping event is maintained as illustrated in FIG. 18A. The vehicle M can therefore arrive at the destination at the target arrival time.

Example 2 of Automated Driving Plan Changed by Action Plan Changing Section

In an example of changing the plan of automated driving, the action plan changing section 145 changes the action plan to an event that causes the vehicle M to change lanes. FIGS. 19A and 19B are views illustrating another example how the action plan is changed. In the example illustrated in FIG. 19A, if the vehicle M traveling in a passing lane L2 for overtaking travels based on the lane keeping event, the vehicle M may arrive at the destination before the target arrival time. In such a case, the action plan is changed to an event that causes the vehicle M to move from the passing lane L2 to the travel lane L1 as illustrated in FIG. 19B. The vehicle M is thereby located just behind another vehicle m traveling in the travel lane L1 and travels following the vehicle m. The vehicle M thereby travels so as to arrive at the destination at the target arrival time. In some travel situation, the vehicle M may move from the travel lane L1 to the passing lane L2 so as to arrive at the destination at the target arrival time.

In an example of changing the plan of automated driving, the action plan changing section 145 changes the action plan to an event that stops the vehicle M for a predetermined period of time. For example, the action plan changing section 145 changes the action plan so that the vehicle M can arrive at the destination at the target arrival time as follows: the vehicle M is parked in a parking space or a rest area located on the route to the destination for a predetermined period of time for adjusting the arrival time. The vehicle M then starts again to the destination. By adjusting the arrival time in such a manner, the vehicle M can arrive at the destination at the target arrival time.

In the aforementioned example, the plan of automated driving is changed to cause the vehicle M to change lanes. However, the target lane determined by the target lane determination section 110 may be changed based on an instruction of the action plan changing section 145. In such a case, the target lane determination section 110 determines a new target lane instead of the already determined lane. If the vehicle M is scheduled to travel in a diverging lane that diverges from the diverging point connected to the passing lane L2, for example, the target lane determination section 110 may set the target lane to the travel lane L1 and then set the target lane to the passing lane L2 before the diverging point. The vehicle M can therefore arrive at the destination at the target arrival time as described above.

Example 3 of Automated Driving Plan Changed by Action Plan Changing Section

Figure 20:
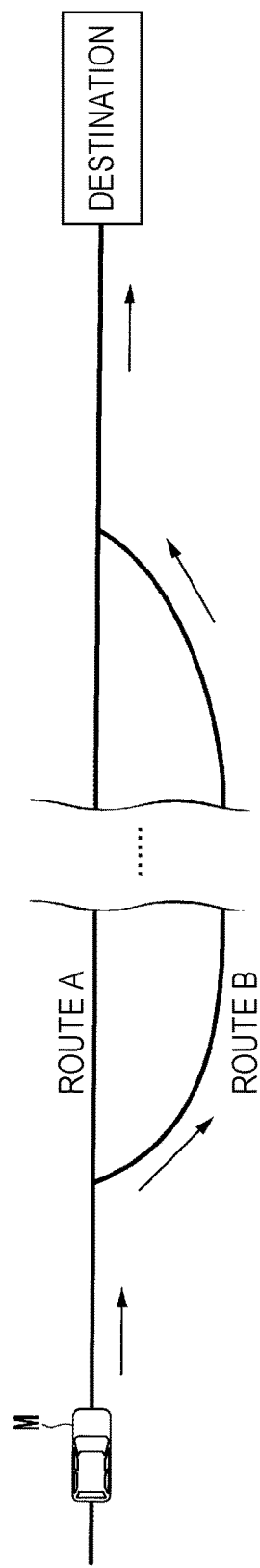
FIG. 20 is a diagram illustrating an example of the way a navigation device calculates a route through which the vehicle M arrives at the destination at target arrival time.

In an example of changing the plan of automated driving, the action plan changing section 145 instructs the navigation device 50 to calculate such a route that the vehicle M arrive at the destination at the target arrival time or after the various types of activities of the vehicle occupant are completed. In this example, it is assumed that the target arrival time is set. FIG. 20 is a view illustrating an example of the way the navigation device 50 calculates such a route that the vehicle M arrive at the destination at the target arrival time. When the target arrival time is set while the vehicle M is traveling, for example, the navigation device 50 searches for and calculates a new route so that the vehicle M arrives at the destination at the target arrival time. As illustrated in FIG. 20, before the target arrival time is set, the navigation device 50 calculates a route A, and the vehicle M is scheduled to travel the route A. However, when the target arrival time is set, the navigation device 50 calculates a route B. The vehicle M is then rescheduled to travel the route B. The route A is a route through which the vehicle M is estimated to arrive at the destination before the target arrival time. The route B is a new route through which the vehicle M is estimated to arrive at the destination at the target arrival time. The vehicle M can therefore arrive at the destination at the target arrival time.

It is assumed that the navigation device 50 calculates a route including a freeway and the vehicle M is scheduled to travel the freeway before the target arrival time is set, for example. In this case, when the target arrival time is set and the vehicle M can arrive at the destination before the target arrival time by traveling the freeway, the action plan changing section 145 instructs the navigation device 50 to calculate another route including surface streets. For example, the action plan changing section 145 changes the route to the route including surface streets when the vehicle M travels the calculated new route including surface streets and is estimated to arrive at the destination within a certain range of time around the target arrival time. This allows the vehicle M to arrive at the destination at the target arrival time without increasing the cost on the vehicle occupant.

In the aforementioned examples, the plan of automated driving is changed so that the vehicle M can arrive at the destination at the set target arrival time or after the vehicle occupant finishes any one or more types of activities. In this modification, the action plan changing section 145 may limit changes of the plan of automated driving when the degree of cost of the new plan of automated driving is not less than the predetermined value. The cost includes the travel distance, fuel consumption, and other risks in the plan of automated driving. The degree of cost increases as the travel distance increases or as the fuel consumption decreases. The degree of cost increases as the other risks increase. The other risks include the number of lane changes, the degree of deceleration, and the like. The other risks increase as the number of lane changes increases or the degree of deceleration increases. The degree of cost may be calculated by weighting the aforementioned items and calculating the weighted sum.

The action plan changing section 145 may cause the display device 82 or the like to display the degree of cost of the plan of automated driving together with information asking whether to employ the newly generated plan of automated driving. If the vehicle occupant selects the change to the newly generated plan of automated driving, the action plan changing section 145 may change the plan of automated driving. The action plan changing section 145 may calculate plural plans of automated driving. In this case, the action plan changing section 145 may cause the display device 82 or the like to display the fuel consumption, the calculated route, the speed of the vehicle M along the route, and the like in each plan of automated driving for comparison.

[Presentation of Plural Travel Modes]

The action plan changing section 145 may calculate the plan of automated driving based on plural travel modes. The plural travel modes include a particular action priority mode, a destination arrival priority mode, and a fuel consumption priority mode, for example. The display device 82 displays a GUI switch to select the travel mode when the destination is set by the vehicle occupant, for example. When the vehicle occupant performs selection operation to for a switch displayed by the display device 82, the selected travel mode is set by the action plan changing section 145.

In the particular action priority mode, the vehicle M is controlled based on the plan of automated driving in which the vehicle M is to arrive at the destination after the expected end time of the particular action.

In the destination arrival priority mode, the vehicle M is controlled based on the plan of automated driving which is not yet changed by the action plan changing section 145. In the destination arrival priority mode, the particular action is terminated when the vehicle M arrives at the destination even before the expected end time of the particular action. The destination arrival priority mode is a mode in which the vehicle M is prevented from arriving late at the destination.

The fuel consumption priority mode is a mode placing an emphasis on the energy efficiency. In the fuel consumption priority mode, the vehicle M does not take a long way, such as detour, even when the particular action is not yet completed. In the fuel consumption priority mode, the vehicle M is parked at the destination or in the parking area near the destination when the vehicle M is estimated to arrive at the destination before the expected end time of the particular action. The vehicle M may be temporarily parked in a parking area located on the route to the destination instead of the destination or the parking area near the destination.

When the vehicle M is parked at the destination or in the parking area near the destination, the vehicle driving changing section 145 may notify the vehicle occupant of arrival at the destination using the speaker 83 or cause the display device 82 to display an image that asks the vehicle occupant whether to continue the particular action. The particular action is continued in the parked vehicle M when the vehicle occupant performs an operation to select continuing the particular action for a GUI switch configured to accept a selection operation, in response to the question displayed by the display device 82, for example.

According to the aforementioned embodiment, the vehicle control system 100 changes the plan of automated driving based on the factors independent of the travel requirements for the vehicle M to travel by automated driving along the route to the destination. This can widen the range of usages of vehicles based on the vehicle occupant's intention.

Hereinabove, the aspects of the present disclosure are described using the embodiment. However, the present disclosure is not limited to the embodiment, and various modifications and substitutions can be made without departing from the scope of the disclosure.

What is claimed is:

1. A vehicle control system comprising:
   an autonomous driving controller configured to execute autonomous driving which autonomously controls at least one of speed control and steering control to allow a vehicle to travel along a route to a destination; and
   a factor acquisition section configured to acquire a factor which is independent of a travel requirement for the vehicle to travel by autonomously driving along the route to the destination, wherein
   the autonomous driving controller changes a plan of the autonomous driving based on the factor acquired by the factor acquisition section.

2. The vehicle control system according to claim 1, wherein the factor is a schedule of particular action that an occupant of the vehicle may perform within the vehicle if the vehicle is autonomously driven.

3. The vehicle control system according to claim 2, wherein
   the particular action is viewing of a content, and
   the autonomous driving controller adjusts a duration of the autonomous driving to an estimated end time of the content.

4. The vehicle control system according to claim 2, wherein
   the particular action is participation in a videoconference, and
   the autonomous driving controller adjusts a duration of the autonomous driving to an estimated end time of the videoconference.

5. The vehicle control system according to claim 2, wherein
   the autonomous driving controller does not change the plan of the autonomous driving based on the factor acquired by the factor acquisition section when the vehicle is estimated to arrive at the destination before the estimated end time of the schedule of the particular action and it is determined that the destination has an area where the vehicle can be parked at the destination.

6. The vehicle control system according to claim 1, wherein
   the factor is a target time of arrival at the destination which is set by the occupant, and
   the autonomous driving controller performs speed adjustment or detour control of the vehicle to delay arrival at the destination when the vehicle is estimated to arrive at the destination before the target time of arrival.

7. The vehicle control system according to claim 6, wherein
   the autonomous driving controller does not perform the speed adjustment or detour control of the vehicle to delay arrival at the destination when it is determined that the destination has an area where the vehicle can be parked.

8. The vehicle control system according to claim 1, further comprising:
   an exterior display device configured to output information to a surrounding vehicle traveling around the vehicle, wherein
   the autonomous driving controller causes the exterior display device to output information prompting the surrounding vehicle to overtake the vehicle when changing the plan of the autonomous driving based on the factor acquired by the factor acquisition section.

9. A vehicle control method to execute autonomous driving which autonomously controls at least one of speed control and steering control to allow a vehicle to travel along a route to a destination, the method comprising the steps of:
   acquiring a factor which is independent of a travel requirement for the vehicle to travel by autonomously driving along the route to the destination; and
   changing a plan of the autonomous driving based on the factor acquired by the factor acquisition section.

10. A computer readable media storing therein a vehicle control program causing an in-vehicle computer to execute autonomous driving which autonomously controls at least one of speed control and steering control to allow a vehicle to travel along a route to a destination, the program comprising the processes to:
    acquire a factor which is independent of a travel requirement for the vehicle to travel by autonomously driving along the route to the destination; and
    change a plan of the autonomous driving based on the factor acquired by the factor acquisition section.

* * * * *